Nov. 14, 1950         A. ZIDAR              2,530,215
           UPSTANDING HANDLE FOR FLOOR SHEARS
                Filed Dec. 1, 1947
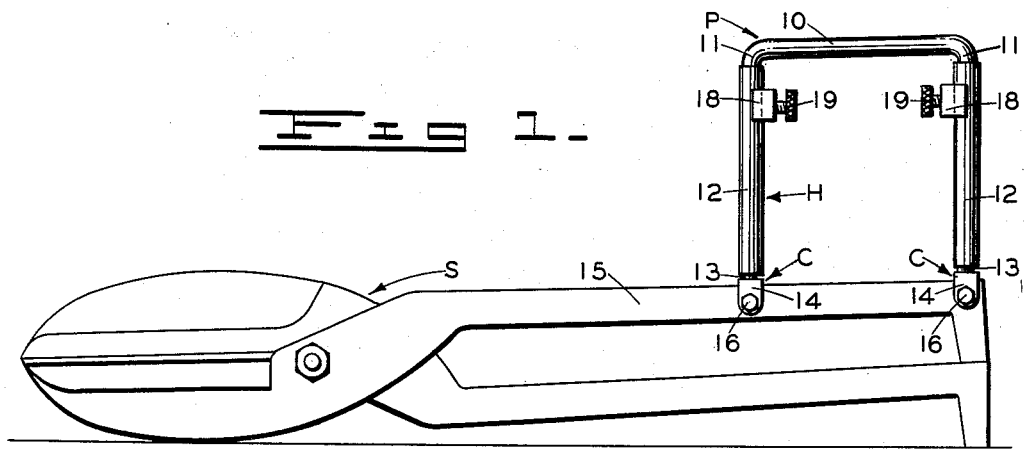
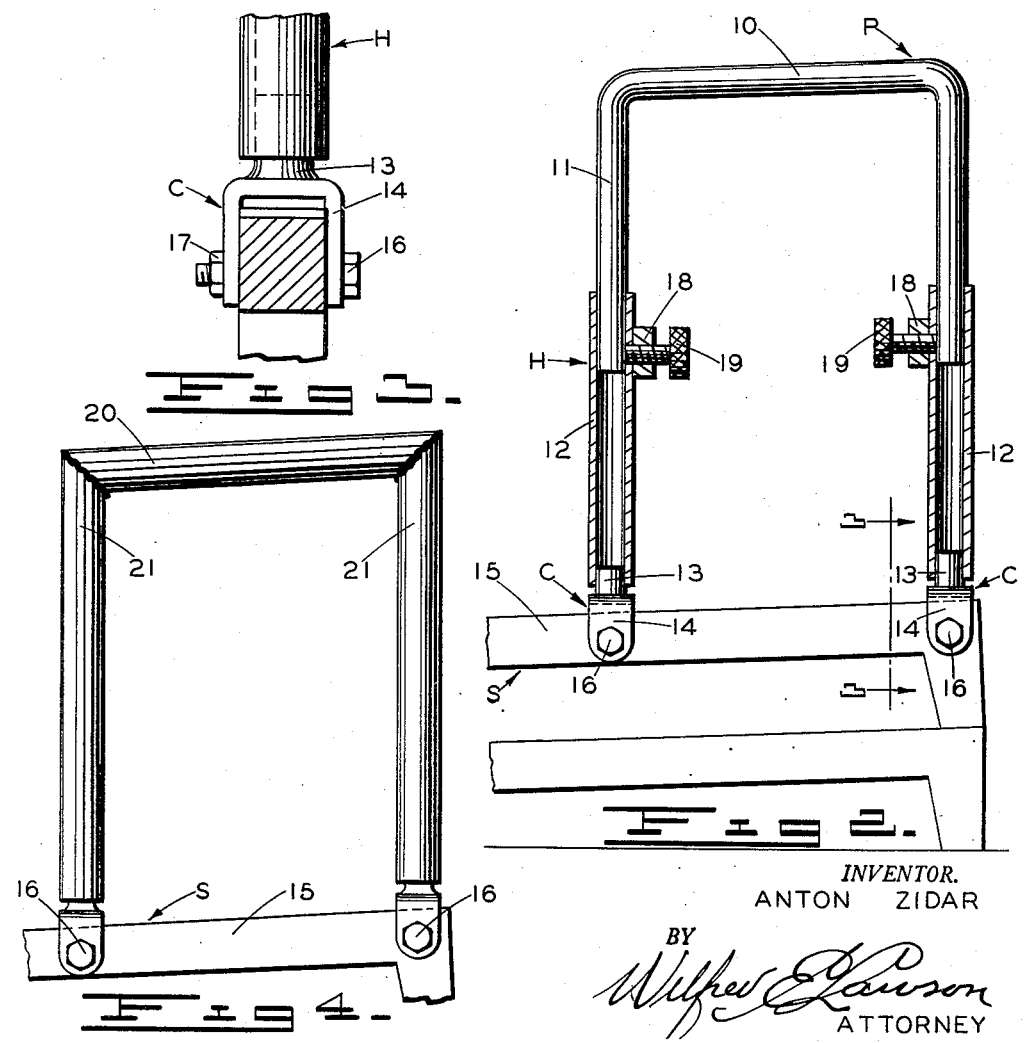
INVENTOR.
ANTON ZIDAR
BY
Wilfred E. Lawson
ATTORNEY Patented Nov. 14, 1950

2,530,215

UNITED STATES PATENT OFFICE 2,530,215

UPSTANDING HANDLE FOR FLOOR SHEARS

Anton Zidar, Cleveland, Ohio

Application December 1, 1947, Serial No. 788,978

3 Claims. (Cl. 30—173)

My invention relates to tools and more particularly to floor shears.

The object of my invention is to provide an upstanding handle on one of the original handles of a floor shear so that men cutting heavy wire mesh or other heavy material do not have to stoop down, eliminating the disagreeable strain created thereby.

Another object of my invention is to provide a floor shear of the character indicated above, the upstanding handle of which is adapted to be adjusted according to the height of the operator.

Other objects of my invention may appear in the following specification describing my invention with reference to the accompanying drawing illustrating some preferred embodiments of my invention. It is, however, to be understood that my invention is not to be limited or restricted to the exact construction and combination of parts described in the specification and shown in the drawing, but that such changes and modifications can be made which fall within the scope of the claims appended hereto.

In the several figures of the drawing illustrating my invention, similar parts are designated by similar reference characters, and Figure 1 is a view in side elevation illustrating a handle embodying the invention and in applied position;

Figure 2 is an enlarged fragmentary view partly in section and partly in elevation with the handle in a second adjustment;

Figure 3 is a detail sectional view taken on the line 3—3 of Figure 2; and

Figure 4 is a fragmentary elevational view of another embodiment of the invention.

The floor shear handle H forming the subject matter of my invention comprises a top bar portion 10, from each end of which a side bar portion 11 extends downwardly at substantially right angles. Preferably these three portions are made from one continuous piece of pipe, but they may be produced individually and firmly connected with each other in any selected conventional manner. The two side bar members 11 are adapted to slide telescopically into extension side bar members 12 preferably made from pipe of the necessary diameter. A connecting piece c has a rod like round body 13 fitting snugly into the lower end of each extension bar 12, and a bifurcated lower end portion 14 adapted to straddle the upper actuating hand lever 15 of a floor shear S. The rod like body 13 is inserted into the extension side member and is secured in position by means of welding or any other conventional means. The assembled handle is then fastened on the rear end portion of the upper actuating hand lever 15 by means of bolts 16 extending through the bifurcations 14 and the hand lever 15 and by nuts 17 screwed onto said bolts, or by any other conventional means. On each extension side bar a block 18 is welded adjacent the upper end of said bar, and a thumb screw 19 extends through each block and the adjacent wall portion of the extension side bar and engages them threadedly. The upper part P of the handle H can then be lowered by sliding the side bars 11 into the extension side bars 12, and can be raised to any desired height by sliding them upwardly so that the handle H may be adjusted to any desired height. By tightening the thumb screws 19, the handle may be kept at the desired height, so that an operator will not have to stoop down to use the floor shear for cutting heavy wire mesh or the like spread out on the floor.

In Figure 4, a modified or simplified form of the above described handle H is illustrated. This modified handle consists of a top member 20 and two side bars 21 rigidly connected or integrally formed with the top bar 20. The lower end portions of the side bars 21 are adapted to be rigidly secured in any desired conventional manner to the rear end of the upper hand lever 15 of the floor shear S.

I claim:

1. The combination with a floor shear having two long handle levers arranged one above the other when in use, of an inverted substantially U-shaped extension handle having two substantially parallel side bars and a cross connecting top bar between the side bars at one end of the latter, and means securing the other ends of the side bars to the handle lever which is uppermost when the shear is in use, to maintain the extension handle upright.

2. The combination as set forth in claim 1, in which the said securing means comprises a pair of bifurcated members between the furcations of each of which the said uppermost handle lever is engaged and a rod like extension integral with each bifurcated member, each of said side bars being formed at the said other end thereof to receive one of said rod like extensions, the said extensions and the said ends of the side bars being fixedly joined together, and a securing element extending transversely through each pair of furcations and through the interposed handle lever.

3. The combination as set forth in claim 1, wherein each of said side bars is formed in two sections, one section being tubular and having the other section slidably engaged therein and means for adjustably securing the two sections of each side bar together.

ANTON ZIDAR.

REFERENCES CITED

The following references are of record in the file of this patent:

UNITED STATES PATENTS

| Number | Name | Date |
|---|---|---|
| 230,393 | Barker et al. | July 27, 1880 |
| 1,062,773 | Eller | May 27, 1913 |
| 1,501,931 | Weddle | July 22, 1924 |
| 1,851,225 | Wesemann | Mar. 29, 1932 |